NOISE DIODES

Filed Oct. 29, 1965 3 Sheets-Sheet 1

INVENTORS
ROLAND H. HAITZ
WILLIAM SHOCKLEY
BY
Flehr and Swain
ATTORNEYS

INVENTORS
ROLAND H. HAITZ
WILLIAM SHOCKLEY
BY
Flehr and Swain
ATTORNEYS

NOISE DIODES

Filed Oct. 29, 1965 3 Sheets-Sheet 3

INVENTORS
ROLAND H. HAITZ
WILLIAM SHOCKLEY
BY
Flehr and Swain
ATTORNEYS

United States Patent Office 3,349,298
Patented Oct. 24, 1967

3,349,298
NOISE DIODES

William Shockley, Los Altos, Calif., and Roland H. Haitz, Dallas, Tex., assignors to International Telephone and Telegraph Corporation, Nutley, N.J., a corporation of Maryland
Filed Oct. 29, 1965, Ser. No. 505,702
7 Claims. (Cl. 317—234)

ABSTRACT OF THE DISCLOSURE

A semiconductor noise diode in which a stable noise output which is relatively insensitive to temperature variations is achieved by limiting the noise generating mechanism substantially to internal field emission effects within the space charge layer at the breakdown region of a limited area p-n junction. The effective area of the p-n junction is limited by surrounding said junction with a ring of higher resistivity semiconductor material having a higher breakdown voltage than that of the enclosed active junction. The effects of temperature-dependent generation of carriers in the bulk of the device are alleviated by making the portion of the bulk extending to the limited area junction in filamentary form, thereby preventing the diffusion of thermally generated carriers into the active breakdown region.

This invention relates generally to noise diodes and more particularly to noise diodes having controlled characteristics.

In recent years, avalanche diodes have been of considerable interest for the generation of high amplitude noise. In this type of diode, avalanche breakdown generally occurs within small regions, so-called microplasmas, along the edge of the p-n junction. These microplasmas are generally associated with disturbances of the electric field within the space charge layer. Such disturbances result from dislocations, precipitates and contamination at the surface of a mesa diode or at the silicon oxide interface of planar diodes. In prior art devices, the microplasmas are, therefore, caused by hard to control parameters which are far from being reproducible. It has, therefore, been a common practice to select noise diodes from commercially available Zener diodes with breakdown voltages of ten volts or more.

Such selection is uneconomical if diodes in large quantities are needed and unsatisfactory if uniform noise performance of a large number of diodes is desired. A further disadvantage of these noise diodes is their strong dependence on operating temperature, non-uniformity of the spectral noise density over the desired frequency range and relatively low noise amplitude. All these shortcomings of noise diodes selected from commercial Zener diodes can be traced to uncontrollable imperfections which cause the formation of the microplasmas.

It is, therefore, a general object of the present invention to provide a noise diode whose noise performance can be determined by a few well controlled diode and circuit constants.

It is a further object of the present invention to provide a noise diode in which the diffusion of thermally generated minority carriers to the breakdown region is minimized to make the noise diodes relatively insensitive to temperature.

It is a further object of the present invention to provide a noise diode in which the generation of carriers, which triggers the avalanche discharges, is determined by internal field emission to make the noise diodes insensitive to temperature.

It is a further object of the present invention to provide a noise diode of the so-called guard ring design in which the breakdown voltage of the guard ring is substantially above the breakdown voltage of the operating diode region.

It is still a further object of the present invention to provide a noise diode in which the operating junction is substantially free of imperfections to provide uniform avalanche breakdown at the operating junction and is surrounded by an edge protecting guard junction.

The foregoing and other objects of the invention will become more clearly apparent from the following description when taken in conjunction with the accompanying drawing.

Referring to the drawing.

Figure 5:
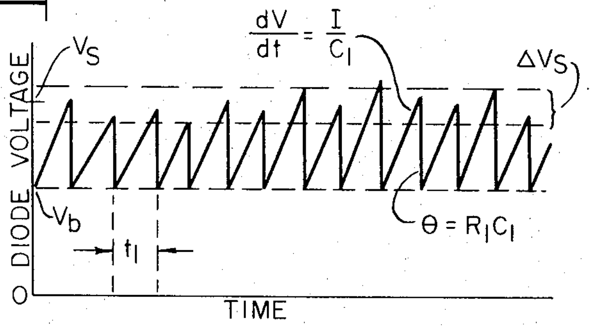
Figure 6:
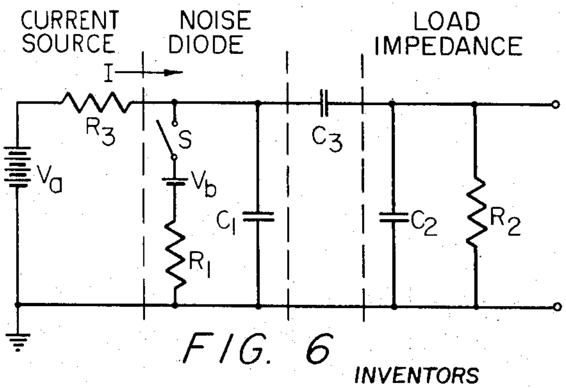
Figure 7:
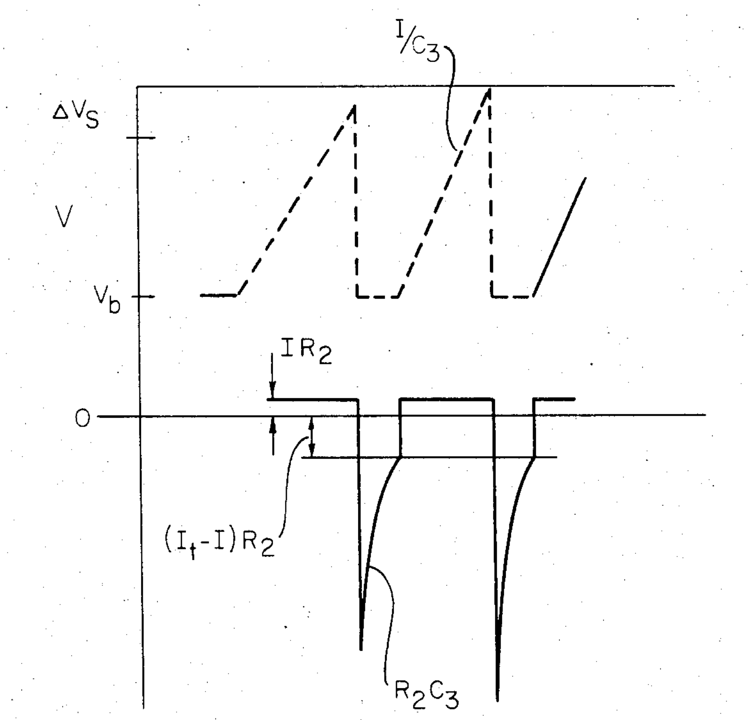
Figure 8:
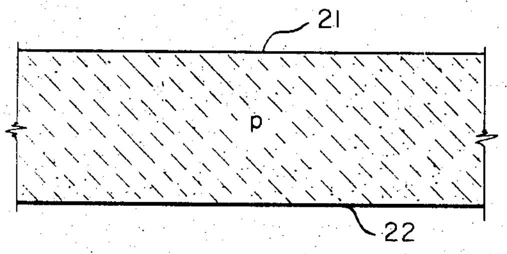
Figure 9:
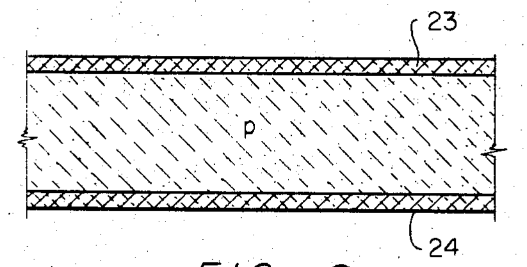

FIGURE 5 schematically shows the diode voltage as a function of time;

FIGURE 6 shows the diode connected in an operating circuit;

FIGURE 7 shows the output voltage as a function of time for the circuit of FIGURE 6; and FIGURES 8–15 are diagrammatic cross-sections of a typical noise diode at various stages of manufacture.

Figure 1A:
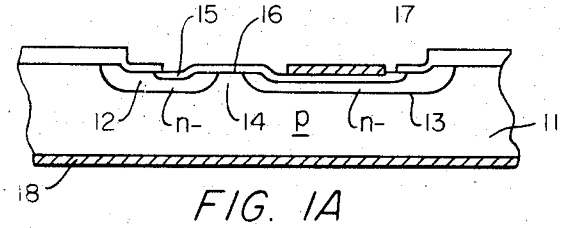
FIGURE 1A is a sectional view taken along the line 1A—1A of FIGURE 1B.
Figure 2:
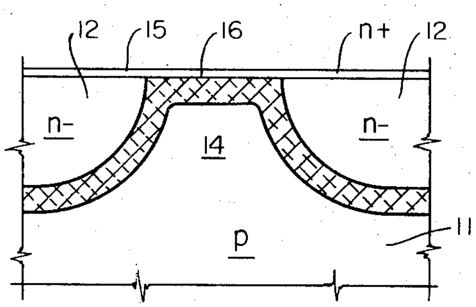
FIGURE 2 is an enlarged view of the center region of the diode shown in FIGURES 1A and 1B.
Figure 1B:
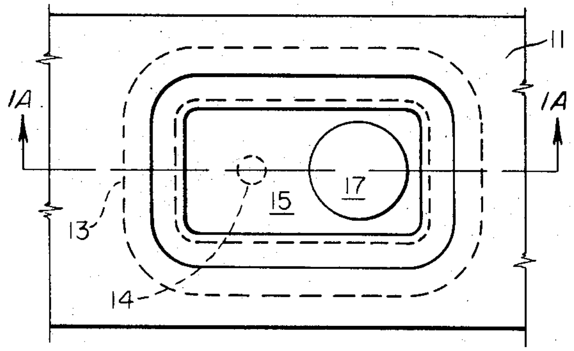
FIGURE 1B is a plan view of a noise diode in accordance with the invention.

Referring to FIGURES 1A, 1B and 2, there is shown a diode incorporating the present invention. The diode includes a p-type body 11. A low impurity concentration n-type region 12, in the form of a ring, is diffused into the p-type body to form a rectifying junction 13. At the center of the ring, the p-type regions extend towards the upper surface to form a filament or channel 14. A higher impurity concentration n-type region 15 is diffused into the body from the upper surface and forms a rectifying junction 16 with the underlying filament 14 and a transition between the low impurity concentration and high impurity concentration n-type regions 12 and 15, respectively. An aluminum dot 17 forms ohmic contact with the n-type region 15. Ohmic contact 18 is provided at the lower surface of the body 11. The exciting voltage is applied between the dot 17 and the contact 18 to reverse bias the two junction regions 13 and 16. An enlarged view of the area surrounding the junction 16 is shown in FIGURE 2. The shaded area indicates the space charge layer.

Figure 3:
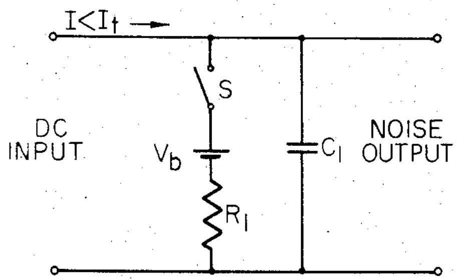
FIGURE 3 is the equivalent circuit of a noise diode.

An equivalent circuit of the diode described is shown in FIGURE 3. $V_b$ denotes a voltage source which is equivalent to the breakdown voltage of the diode. $R_1$ and $C_1$ denote the series resistance and the shunting capacitance of the diode, respectively.

For the generation of random noise, the bistable switch S is the most important element. Its switching behavior is described with reference to FIGURE 4 where the voltage-current characteristic of a diode is plotted. The switch S opens as soon as the current through the breakdown region drops below a certain turn-off current $I_t$ which may be in the order of 30–150 microamps. For a diode with a series resistance of 1000 ohms, the corresponding turn-off voltage $V_t$ is approximately 30–150 mv. above $V_b$. Such a small voltage difference is negligible as compared with the pulse amplitudes generated which are of the order of 2–20 volts. It is, therefore, justified to say that switch S opens as soon as the voltage across the shunting capacity $C_1$ drops to the breakdown voltage $V_b$. The closing of the switch can be described by continuous voltage dependent probability function $\Phi(V)$, which is assumed to be completely determined by internal field emission within the space charge layer of the uniform breakdown region at the junction 16. It has been experimentally shown that one type of diode switches on practically always within a voltage interval $\Delta V_s$ which was in the order of 10–30 volts above the $V_b$ and approximately 4–8 volts wide.

Figure 4:
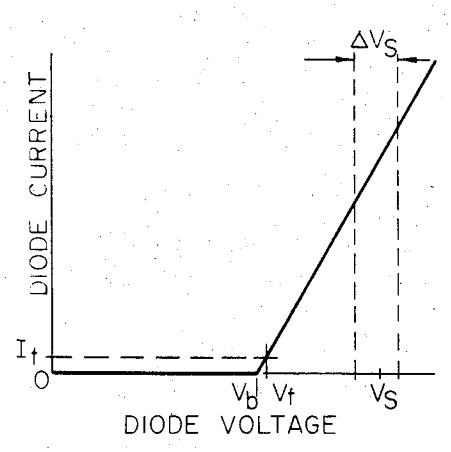
FIGURE 4 shows the current voltage characteristics of a typical noise diode.

With this simplified model, it is possible to describe the noise performance of the diode. At the beginning of the pulse cycle, the switch S is assumed to be open. As shown in FIGURE 4, the diode capacitance $C_1$ is charged by current $I<I_t$ from a current source of infinite impedance. The rate at which the diode voltage rises is $V=I/C_1$. As soon as the diode voltage reaches a value within the interval $\Delta V_s$, the diode switches on. The probability that the diode switches at voltages below or above the interval is small. After the diode switches on, the capacity $C_1$ is discharged through resistor $R_1$. The diode voltage drops exponentially with a time constant $R_1 C_1$. Approximating the exponential voltage decay by a linear function, the resulting noise is a sawtooth wave, FIGURE 5, with amplitude fluctuating randomly within the interval $\Delta V_s$.

The three constants $V_b$, $R_1$ and $C_1$ are actually not completely constant. $V_b$ increases slightly with temperature. The influence of this effect on noise performance is small if the amplitude of the noise pulses is in the order of 10 volts or more. A slight variation of $R_1$ with temperature is of no influence on the noise. The shunting capacity $C_1$, which is mainly due to the deep diffused guard ring (12) capacity, varies approximately as 1⅓. Even if the diode voltage increases to $2V_b$, the capacitance will decrease by only about 25%. Such small variations in the capacity are also negligible.

The avalanche diodes always turn off within a voltage interval approximately 10 mv. wide and 30–150 mv. above $V_b$. For pulse amplitudes of 2–30 v., the width of this turn-off interval is negligible, and it is justifiable to assume a discrete voltage at turn-off, which may be approximated satisfactorily by $V_b$.

The physical mechanism behind the closing operation is described as follows: To switch the diode at a voltage of $V_b$ from its non-conducting to its conducting state, a carrier has to be generated within the space charge or breakdown region, or has to diffuse to the space charge region adjacent the junction 16. At a diode voltage of one or more volts above $V_b$, such a carrier is certain to trigger a continuous avalanche breakdown which is only interrupted by lowering the diode voltage to $V_t$.

This trigger carrier can be generated by one of five mechanisms as follows:

(1) Light with a quantum energy of more than the band gap;

(2) Thermal generation via generation centers outside the space charge layer;

(3) Thermal generation via generation centers within the space charge layer;

(4) Re-emission of carriers trapped during preceding breakdown periods; and (5) Carrier generation by internal field emission.

The mechanisms from (1) to (4) above can all be suppressed effectively. By placing the diode in a metal can, incident light is shielded effectively from the diode. A diode geometry in accordance with the invention including a filament or pedestal prevents thermal carriers from diffusing to the breakdown region. The diffusion of electrons from the p-type bulk material to the $n+p$ breakdown region is suppressed considerably by the geometry including the filament. The narrow filament 14 prevents electrons from diffusing from the bulk to the breakdown junction because the pn-junction which forms the boundary of the filament acts like an absorbing barrier for electrons. Heating the diode locally by passing high currents through the breakdown region reduces the density of generation and trapping centers effectively. Thus, for a diode of the type described, the generation resulting from the mechanisms described in (1) through (4) above may be as low as one per second within the breakdown region or its immediate vicinity, even at room temperatures.

From these considerations, it is obvious that the carrier generation by internal field emission may well exceed any other generation mechanism providing the diode voltage reaches values high enough for a proper emission rate. By use of a guard ring, such voltages are assured.

Referring to FIGURE 6, there is shown a diode connected in an external circuit which gives a flat spectral noise distribution over a wide frequency range. The Fourier analysis of the sawtooth waves shown in FIGURE 5 indicates that the frequency dependence of the spectral noise distribution arises mainly from the slowly rising leading edge of the pulses. To avoid such slow and large voltage changes at the leading or trailing edges of the noise pulses, an external circuit of the type shown in FIGURE 6 is provided.

The relative magnitudes of the components shown in this figure are that $R_1$ is very much smaller than $R_2$ which, in turn, is very much smaller than $R_3$, and $C_1$ is approximately equal to $C_2$; in turn, both are very much smaller than $C_3$.

Assuming the switch S to be open, the current $$I=(V_a-V_b)/R_3$$

charges the two capacitors $C_1$ and $C_3$ at a rate given by $I/(C_1+C_3)$. During this charging period, the voltage at the output terminal is negligible, being $IR_2$ or approximately 100 millivolts. When the voltage across $C_1$ reaches the values within the switching interval $\Delta V_s$, then the field within the space charge layer is so high that carriers may be generated by internal field emission. These carriers trigger avalanche discharge. Such a trigger process is equivalent to the closing of switch S. The avalanche currents discharge the capacitors $C_1$ and $C_3$. The resulting voltage pulses at the output terminals have the spike-type shape shown in FIGURE 7. The essential feature from the point of view of noise generation is the variation from pulse to pulse both in height and in time lag owing to fluctuations in the voltage in $\Delta V_s$ at which firing occurs. The spike pulses of FIGURE 7 represent both these aspects and thus contain a band of noise power. The exact details of output including a transient with time constant $(C_1+C_2)R_2<<C_3R_2$ need not be considered for these purposes but can be included by conventional circuit theory if necessary.

The following sets forth the steps in the manufacture of a typical noise diode. A silicon slice is selected and is preferably of the p-type Czochralski material with a low dislocation density. The resisitivity is selected to be in the range of $0.35\leq\rho\leq0.55$ ohm cm. Both sides are lapped. One side is mechanically polished, and subsequently carefully electropolished to give a slice of a thickness of approximately 120–150 microns, FIGURE 8. For purposes of the following description, the upper surface 21 is the electropolished surface, while the surface 22 is the mechanically lapped surface. The slice is then subjected to steam oxidation to form oxide layers 23 and 24, FIGURE 9.

Figure 10:
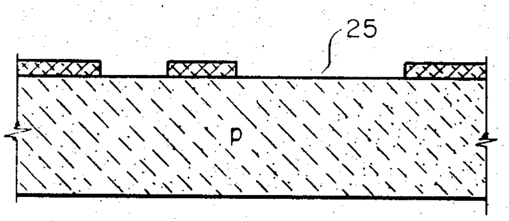
Figure 11:
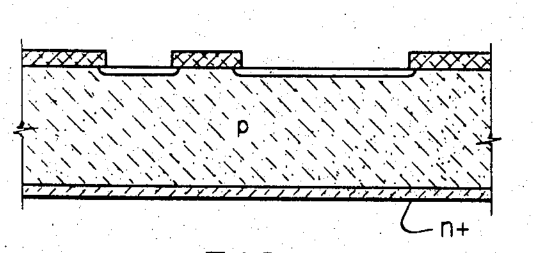
Figure 12:
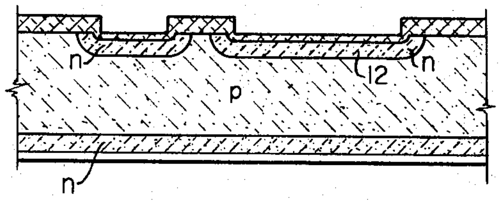

The oxide coated slice is masked and etched to remove the oxide layer from the surface 22 and form a ring-like opening 25 on the upper surface through which the so-called guard ring 12 is diffused, FIGURE 10. To form the n-type guard ring 12, $P_3N_5$ material is predeposited onto the surface 21 through the windows 25, FIGURE 11. This is followed by a diffusion step which forms the region 12, FIGURE 12.

Figure 13:
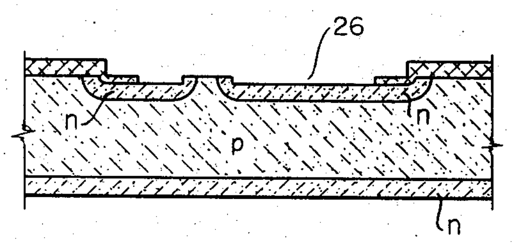
Figure 14:
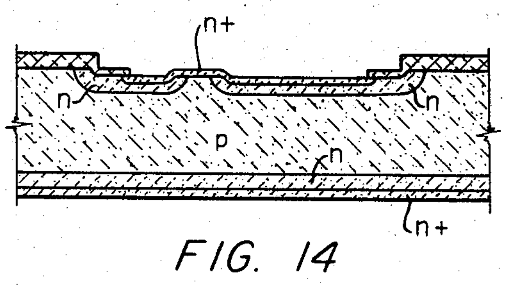
Figure 15:
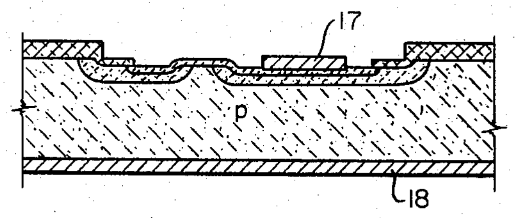

This step is then followed by opening a window 26 in the oxide, FIGURE 13. Then, there is a predeposition in dry argon atmosphere of $P_3N_5$ on the upper surface, FIGURE 14. The lower n-type surfaces are removed, FIGURE 15. Contacts 17 and 18 are than provided (FIGURE 1).

For diodes which operate at 25–30 volts, predepositions and diffusions may be such as to give surface concentrations $C_s$ and junction depths $x_j$ as follows:

| | $C_s(10^{20}\ cm.^{-3})$ | $x_j(\mu)$ |
|---|---|---|
| Guard ring predeposition | 3 | 0.5 |
| Guard ring diffusion (12) | 0.3 | 16–21 |
| Diode predeposition (15) | 4 | 0.4 |

For diodes which operate at 10–15 volts, predepositions and diffusions may be such as to give surface concentrations, $C_s$, and junction depths $x_j$ as follows:

| | $C_s(10^{20}\ cm.^{-3})$ | $x_j(\mu)$ |
|---|---|---|
| Guard ring predeposition | 7 | 0.3 |
| Guard ring diffusion | 0.5 | 9.3 |
| Diode predeposition | 7 | 0.3 |

Typical dimensions in the plane of the surface for the filament 14, diode region 15, guard ring 12 and contact 17 are 10, 200, 250 and 100 microns, respectively, in each instance. The diameter of the breakdown region is important and it is preferably made as small as possible to reduce the effective breakdown volumes. Breakdown volumes of the order of $10^{-11}$ cm.$^3$ and less have been found to be very satisfactory.

It will be apparent to a person skilled in the art that although a device having a particular arrangement of conductivity types has been described, the arrangement of conductivity types can be interchanged without departing from the spirit or scope of the present invention.

Thus, there is provided a diode having an avalanche breakdown junction of relatively small volume to assure uniformity of the same surrounded by a guard junction. The impurity concentration of at least one of the regions forming the avalanche breakdown junction is relatively high in comparison to the regions forming the guard junction whereby the breakdown voltage of the avalanche junction is substantially below that of the guard ring junction. Thus, the voltage at breakdown can be raised substantially above the avalanche value for the breakdown junction to cause field emission of carriers which are multiplied and trigger the breakdown. The avalanche junction is disposed at the end of a filament which is bounded by the larger junction. This acts as an absorbing barrier for the carriers diffusing towards the avalanche junction.

We claim:

1. Semiconductor noise generating apparatus, comprising:

a body of semiconductor material having a principal region of one conductivity type;

an annular region of opposite conductivity type inset into said principal region and adjacent a given surface of said body, the boundary between said regions forming a generally cylindrical P-N junction having an associated reverse bias breakdown voltage, said junction enclosing a filamentary portion of said principal region, said filamentary portion having an end section adjacent said given surface;

a layer of semiconductor material of said opposite conductivity type in said body disposed between said end section and said given surface, said layer having a higher concentration of conductivity-type-determining impurities than said generally cylindrical P-N junction and forming in cooperation with said end section a limited area P-N junction having a given reverse bias breakdown voltage substantially lower than the reverse bias breakdown voltage of said generally cylindrical P-N junction;

a first electrode on said body electrically connected to said layer;

a second electrode on said body electrically connected to said principal region; and electrical bias means for applying between said electrodes a potential greater than said given voltage but less than said associated voltage thereby to cause reverse breakdown of only said limited area junction to produce a signal at said electrodes having a relatively stable noise component.

2. Semiconductor apparatus according to claim 1, wherein said first electrode is also electrically connected to said annular region.

3. Semiconductor apparatus according to claim 2, wherein said layer is contiguous with said annular region and said first electrode is disposed on at least a portion of said layer.

4. Semiconductor apparatus according to claim 1, wherein said filamentary portion has a diameter not exceeding a value on the order of ten microns.

5. Semiconductor apparatus according to claim 1, wherein the breakdown volume of said limited area junction does not exceed a value on the order of $10^{-11}$ cm.$^3$.

6. Semiconductor apparatus according to claim 1, wherein said filamentary portion has a length substantially equal to or greater than its diameter.

7. Semiconductor apparatus according to claim 1, wherein the impurity concentration of said annular region is approximately one-tenth the impurity concentration of said filamentary portion.

References Cited

UNITED STATES PATENTS

| | | | |
|---|---|---|---|
| 3,183,128 | 5/1966 | Leistiko | 148—186 |
| 3,253,197 | 5/1966 | Haas | 317—235 |
| 3,275,482 | 9/1966 | Meer | 148—177 |
| 3,309,241 | 3/1967 | Dickson | 148—33.5 |

JOHN W. HUCKERT, *Primary Examiner.*

M. H. EDLOW, *Examiner.*